(12) United States Patent
Maubant et al.

(10) Patent No.: US 7,228,746 B2
(45) Date of Patent: Jun. 12, 2007

(54) STRAIN-MEASURING DEVICE

(76) Inventors: Philippe Maubant, 25, rue Saint Nicolas, F-68340 Riquewihr (FR); Régis Tridemy, 124, rue du Château Zu Rhein, F-68200 Mulhouse (FR)

( * ) Notice: Subject to any disclaimer, the term of this patent is extended or adjusted under 35 U.S.C. 154(b) by 146 days.

(21) Appl. No.: 10/507,369

(22) PCT Filed: Mar. 26, 2003

(86) PCT No.: PCT/FR03/00955

§ 371 (c)(1),
(2), (4) Date: May 11, 2005

(87) PCT Pub. No.: WO03/081170

PCT Pub. Date: Oct. 2, 2003

(65) Prior Publication Data

US 2006/0042398 A1    Mar. 2, 2006

(30) Foreign Application Priority Data

Mar. 27, 2002 (FR) .................................. 02 03815

(51) Int. Cl.
*G01N 3/20* (2006.01)
(52) U.S. Cl. ...................................................... 73/849
(58) Field of Classification Search .................. 73/849
See application file for complete search history.

(56) References Cited

U.S. PATENT DOCUMENTS

| | | | | |
|---|---|---|---|---|
| 3,700,055 A | * | 10/1972 | Gaulier | 177/204 |
| 4,090,404 A | * | 5/1978 | Dupont et al. | 73/119 A |
| 4,185,720 A | * | 1/1980 | Wright et al. | 188/134 |
| 5,038,622 A | * | 8/1991 | Tijmann | 73/862.393 |
| 6,504,114 B1 | * | 1/2003 | Lockery et al. | 177/229 |
| 6,554,549 B1 | * | 4/2003 | Kurz | 408/1 R |
| 7,084,529 B2 | * | 8/2006 | Face et al. | 307/116 |

* cited by examiner

*Primary Examiner*—Max Noori
(74) *Attorney, Agent, or Firm*—Jackson Patent Law Office

(57) ABSTRACT

The invention relates to a miniature, integrated strain-measuring device with a simple and economical design which can be mass produced at least cost and comprising reliable, reproducible and tamperproof settings. The inventive device can be quickly installed on the structure to be measured without the need for a specialist technician and without altering said structure. The device comprises a deformable element (20) which is mounted between two mounting posts (30, 40) which are intended to be fixed to a structure (1) to be measured, said deformable element (20) bearing strain gauges (61) which are connected to an electronic signal-conditioning circuit (70). The invention is characterised in that it comprises means of prestressing (80) the deformable element (20), said means being provided with at least one prestressing rod (81) which extends between the two mounting posts (30, 40). The aforementioned rod is designed to move the two mounting posts (30, 40) closer together in translation and to impose a prestressing curve on said deformable element (20). The above-mentioned prestressing means (80) also comprise a compensation member (85) which allows the two mounting posts (30, 40) to move in translation in relation to one another when the deformable element (20) is prestressed, such that measurements can be taken on the structure (1). The invention is suitable for any application requiring the measurement, inspection, detection or monitoring of deformation in structures, engineering works and mechanical parts, etc. which are subjected to stresses.

34 Claims, 9 Drawing Sheets

Figure 1:
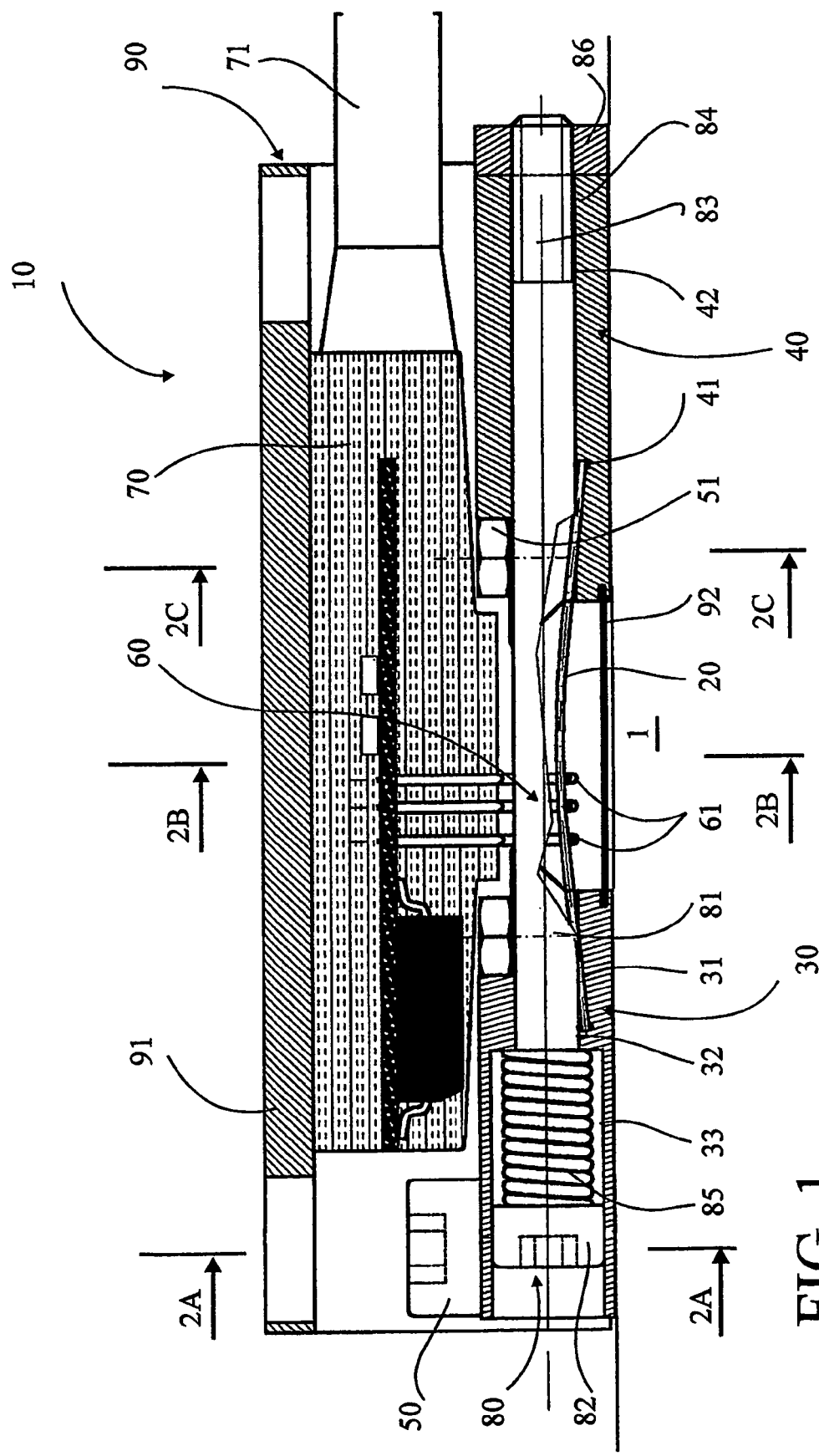

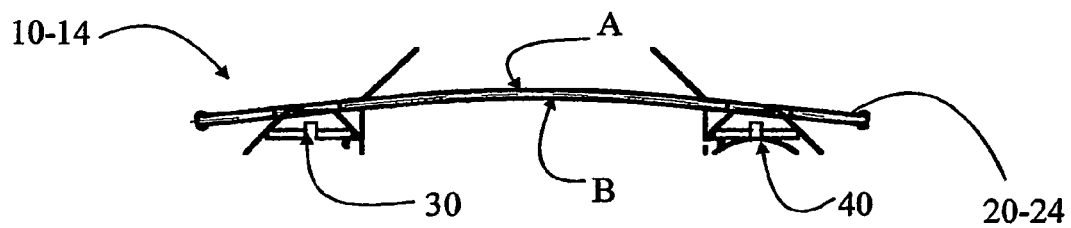
FIG. 7
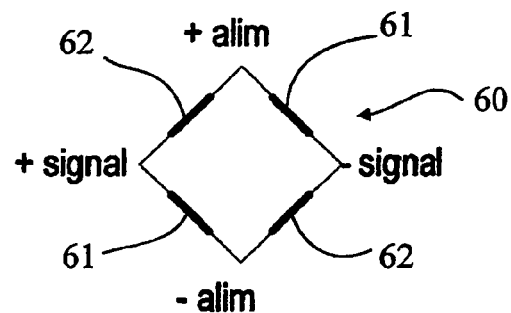
FIG. 8
FIG. 9A
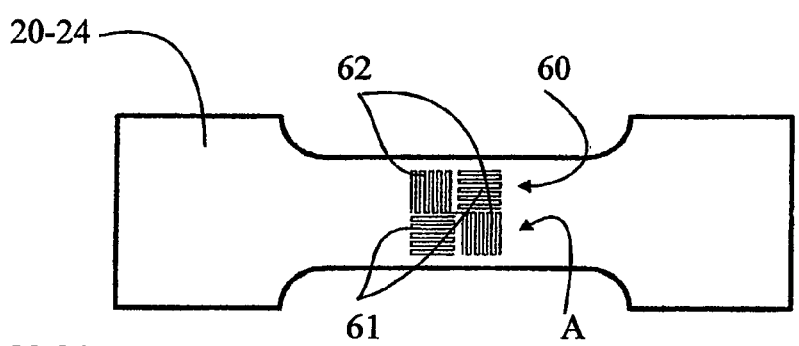
FIG. 9B
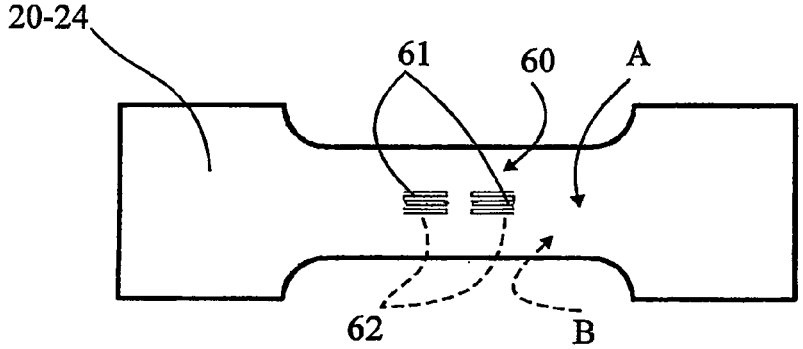
FIG. 9C
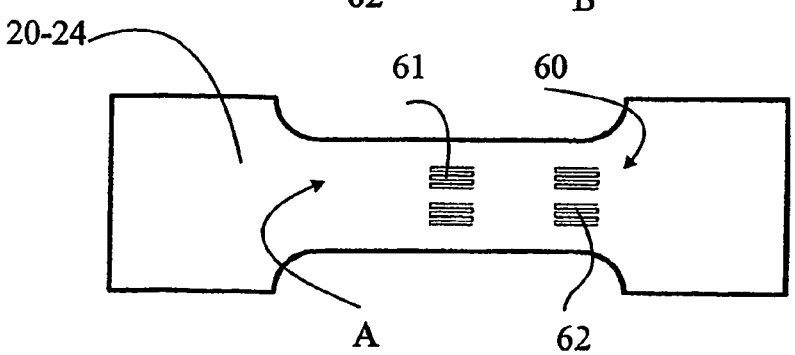

STRAIN-MEASURING DEVICE

The present invention concerns a strain-measuring device including at least a deformable element placed between at least two mounting contacts defining a fixation surface for being fixed on a structure to be measured, means for prestressing the aforementioned deformable element, means for measuring the stress undergone by the aforementioned deformable element, and means for treating signals.

Strain measurements consist of detecting deformations of a structure under the effect of stresses due to applied forces, to the relaxation of residual stresses and/or to thermal dilations. The measurement of the elongation or of the contraction of a surface of this structure according to a known approach is normally realized by means of a deformable element prestressed or not, for example an elastic strip, fixed at its end in two points of fixation of the surface to be measured. The displacement of the ends to the deformable element, representative of the displacement of the two points of fixation of the surface to be measured, modifies the radius of curvature of the deformable element. For realizing a device for measuring strain, one couples, to this deformable element, means for measuring capable of measuring the strains that it undergoes. These means for measuring are constituted by for example a vibration sensor measuring the particular frequency of vibration of the deformable element coupled to the means of exciting into vibration, a contactless sensor measuring the height of this deformable element, one or several strain gauges glued on one or the two faces of this deformable element, etc.

In the American Patent U.S. Pat. No. 5,353,645, the device for measuring the deformation is lodged in a boring of a structure to be controlled and includes a deformable element extended across this boring and coupled at one of its ends to a pressure or force sensor and at the other end to the aforementioned structure. This sensor can be arranged in a screwed contact on the structure in a manner to place the deformable element under stress. Nevertheless, this mode of prestressing cannot be realized except on the structure to be controlled, and is neither reproducible nor controllable.

The American Patent U.S. Pat. No. 4,314,481 describes a device for measuring tensile stress using a flange fixed on a piece to be controlled by means of a fixation screw and coupled to a piezoelectric sensor arranged to the right of one of the points of support of the flange on the piece. This piezoelectric sensor is constituted by two superimposed piezoelectric washers and sensitive to shearing. To be able to function, this device is placed under force by the fixation screw. In this case, the prestress is directly tied to the torque of the fixation screw and does not produce the same effects that this applies to a deformable element.

In the publication FR-A-2,701,317, the bended deformable element is a folded strip in Omega shape. This particular form requires folding zones difficult to reproduce. Because of this fact, the mechanical characteristics of this strip are different from one another. The direct fixation of the ends of the strip on the surface to be measured can be difficult and permits no conservation of preadjustments. No control of the prestress is possible with this particular form of strip. Furthermore, this design does not permit realization of a strain-measuring device integrated in a single piece but necessitates an assembly more or less crafted in several pieces, hence a complex and costly implementation.

The publication WO-A-00/57149 proposes a strain-measuring device in the form of an integrated combination but still presenting certain disadvantages. The mode of fixation of the deformable element in the mounting contacts causes a relatively large moment that requires fixing these mounting contacts on the surface to be measured by means of screws of relatively large diameter thus effecting non negligible tappings in the structure under stress. This moment prevents the fixation of mounting contacts by simple gluing. This is because this device is designed to interpose wedges under the mounting contacts, receiving the fixation screws of the mounting contacts, these wedges capable of being glued on the surface to be measured. Nevertheless, they considerably augment the gluing surface. By this type of mounting, the deformable element is separated from the surface to be measured, entailing a sensibility to parasitic deformations and a large calibration error in flexing. The mode of fixation of the deformable element is a hyperstatic mounting, but with a mechanical sensitivity somewhat weak and a high sensitivity to temperature, making its compensation very difficult. This device includes a means for adjusting the prestress. However, the adjusting of the prestress, which defines the characteristics of the extensometer, is not possible except after its fixation on the surface to be measured or on any support and is thus not reproducible. Furthermore, no device permits conservation of this adjustment after dismantling and/or during transport. Finally, the design of the device permits integration of only one basic conditioning electronic circuit, and its assembly remains somewhat complex.

The strain-measuring device described in publication WO-A-99/41565 essentially concerns a device mass produced, at lower cost and intended to be glued on a surface to be measured by allowing very large dilations of this surface, notably thermal. The prestressed deformable element is blocked during transport by means that do not ensure the adjustment of the prestress. The adjustment of the prestress cannot be effected except by a supplemental device exterior to the device. However, this adjustment is not sufficiently reliable and necessitates a recalibration in situ. The balance of forces is only realized very approximately because the compensation spring working in tensile stress is not regulatable. One can correct the forces only in a direction, requiring positioning of the deformable element on simple supports. The consequences of this are a difficult adjustment and a positioning of the device sensitive to the shocks and to the variations of the functioning cycle. Linearity and hysteresis are strongly influenced by the quality of the supports and thus very difficult to control.

Strain measurements can be used in a multitude of applications such as in equipment for security, regulation and/or control for
measuring forces applied to a structure,
surveilling the deformations of a work or of a structure under service or accidental loads,
measuring the drive or breakage coupling in a vehicle,
weighing,
controlling overloading.

Nevertheless, considering their disadvantages, the techniques currently used in the strain-measuring devices do not permit generalization of the use in these applications.

The present invention aims to compensate for these disadvantages and proposes a miniature, integrated strain-measuring device, of simple design and economical, capable of being mass produced at lower cost, of which the adjustments are reliable, reproducible and not disajustable, capable of being rapidly installed on a structure to be measured without a specialized technician and without modifying the structure.

Toward this end, the invention concerns a strain-measuring device of the kind indicated in preamble characterized in that the prestressing means extend between at least the two mounting contacts and are arranged for drawing together these two mounting contacts in translation and imposing a curvature of precise prestress to the aforementioned deformable element, the prestressing means being also arranged for allowing a relative displacement in translation of these two mounting contacts when the aforementioned deformable element is prestressed.

In one form of preferred implementation, the prestressing means are freely mounted in translation in one of the mounting contacts and are tied at least in translation to the other mounting contact. These prestressing means can include at least a prestressing rod, of which at least the part tied in translation to the other mounting contact is threaded and cooperates with at least a nut for displacing the aforementioned mounting contact and at least a compensation member arranged for exercising a return force between the aforementioned prestressing rod and one of the mounting contacts.

In a variant implementation, the prestressing means can be tied at least in translation to the two mounting contracts. These prestressing means can then include at least a prestressing rod, of which at least the parts tied in translation to the aforementioned mounting contacts are threaded in an opposite direction, at least two nuts arranged for receiving the aforementioned threaded parts from the prestressing rod and at least a compensating member arranged for exercising a return force between the aforementioned mounting contacts.

According to the chosen implementations, the nut can be integrated with or coupled to the corresponding mounting contact. It can also be constituted from a tapped boring provided in the aforementioned mounting contact. One can also provide a supplementary nut coupled on to the end of a threaded part of the aforementioned prestressing rod and forming a locking counter-nut. The prestressing rod can be chosen from the group including at least screws, bolts, pins, and the compensating member can be chosen from the group including at least springs, elastic washers, wedges of elastomer, and leaf springs.

In certain cases, the strain-measuring device can include a single deformable element arranged between two mounting contacts approximately parallel to the fixation surface of these contacts and arranged for deforming itself in a plane oriented perpendicular to this surface. In this case, the prestressing means can include two prestressing rods or a prestressing rod and a guiding rod, arranged parallely and symmetrically with respect to the median plane passing through this deformable element.

In other cases, the prestressing means can include a single prestressing rod arranged in the median plane passing through the aforementioned deformable element. This deformable element can then include a central hollow of traverse dimensions superior to those of the prestressing rod.

In still others cases, the measuring device can include two deformable elements arranged between two identical mounting contacts, symmetrically with respect to a median plane of the aforementioned device, approximately perpendicular to the fixation surface of these contacts and arranged for deforming themselves in a plane approximately parallel to this surface. In this case, the prestressing means include a single prestressing rod in this median plane.

To measure deformations in at least two directions, the strain-measuring device can include at least two and preferably three distinct mounting contacts and a common mounting contact.

In one of the variant implementations, the strain-measuring device includes at least a deformable element extending between the aforementioned common mounting contact and each distinct mounting contact, the aforementioned deformable elements being angularly shifted from an angle $\alpha$, this angle having a value chosen from the group including at least 30°, 45°, 60°, 90° and 120°.

In another variant implementation, the strain-measuring device includes at least a deformable element extending between each pair of distinct mounting contacts, the aforementioned deformable elements being arranged approximately in a triangle.

The deformable element is, preferably, constituted of an elastic strip made of a material chosen from the group including at least stainless steel with or without structural hardening, titanium alloys, and copper alloys with beryllium. The deformable element and the mounting contacts can be advantageously formed from a single piece in a material of which the coefficient of dilation is close to that of the structure to be measured, this material being chosen from the group above including also aluminum alloys having a high elastic limit. In this case, the aforementioned deformable element is manufactured or cut from a material to give it an initial curvature in a direction of its prestress curvature.

According to the predicted results, the deformable element can be mounted by at least one of its ends in one of the mounting contacts by at least one technique chosen from the group including at least fitting, interlocking, screwing, riveting, gluing, and welding. The aforementioned mounting contact can include a mounting zone for receiving the aforementioned end of the deformable element, this mounting zone being advantageously inclined with respect to the fixation surface of the aforementioned mounting contact in a manner to give the aforementioned deformable element an initial curvature in a direction of its prestress curvature.

According to the applications, the mounting contacts are advantageously intended to be fixed on the aforementioned structure to be measured by at least one technique chosen from the group including at least screwing, riveting, gluing, and welding.

As a function of the technique used, the means for measuring stress undergone by the aforementioned deformable element are chosen from the group including at least resistive stress gauges, piezoelectric sensors, vibration sensors, and proximity contact sensors.

In a preferred mode, there are four stress gauges in a Wheatstone bridge.

The strain-measuring device preferably includes a protective housing at least partially covering the mounting contacts and the deformable elements(s), this housing being able to be waterproofed as a function of the environment.

The means for treating signals includes at least an electronic conditioning circuit, this circuit being able to be integrated or coupled to the aforementioned housing, or displaced and linked to the aforementioned housing by communication means. These means for treating can also be arranged for measuring the internal temperature of the device and correcting the values of the signals as a function of this temperature.

Figure 2A:
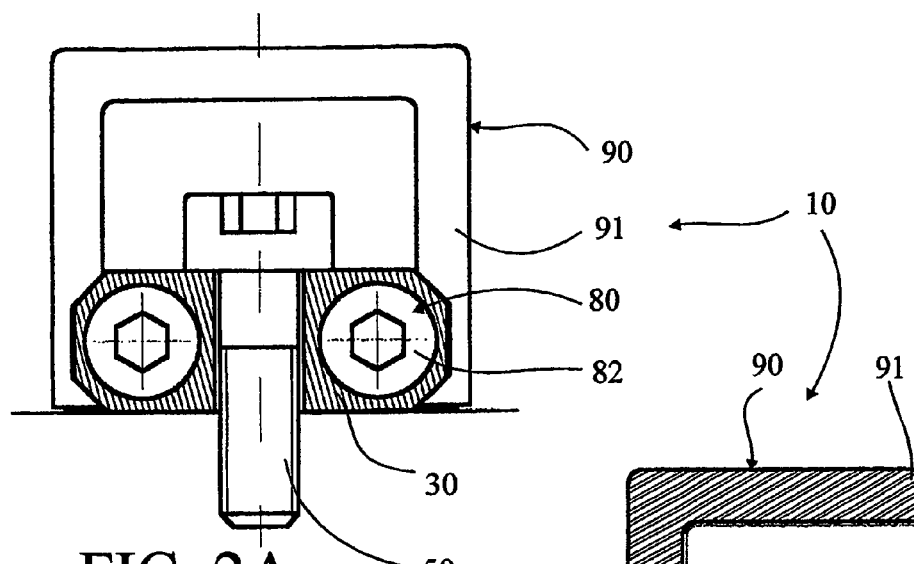
Figure 2B:
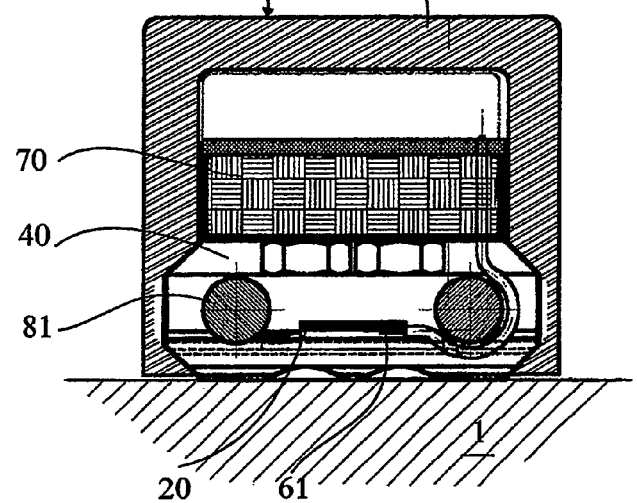
Figure 2C:
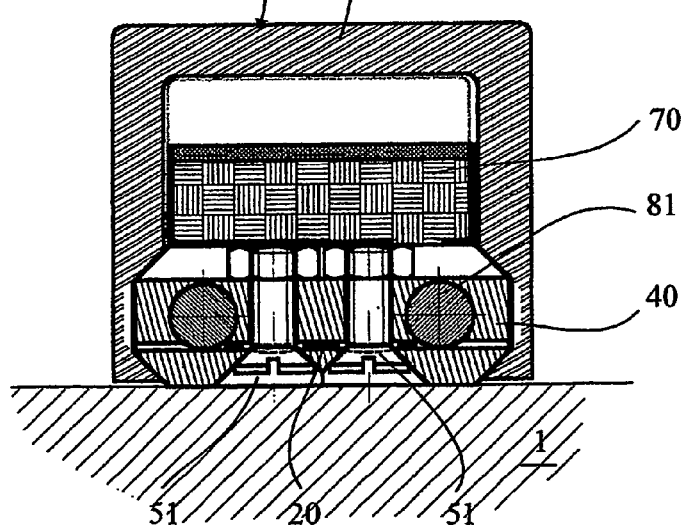
Figure 3:
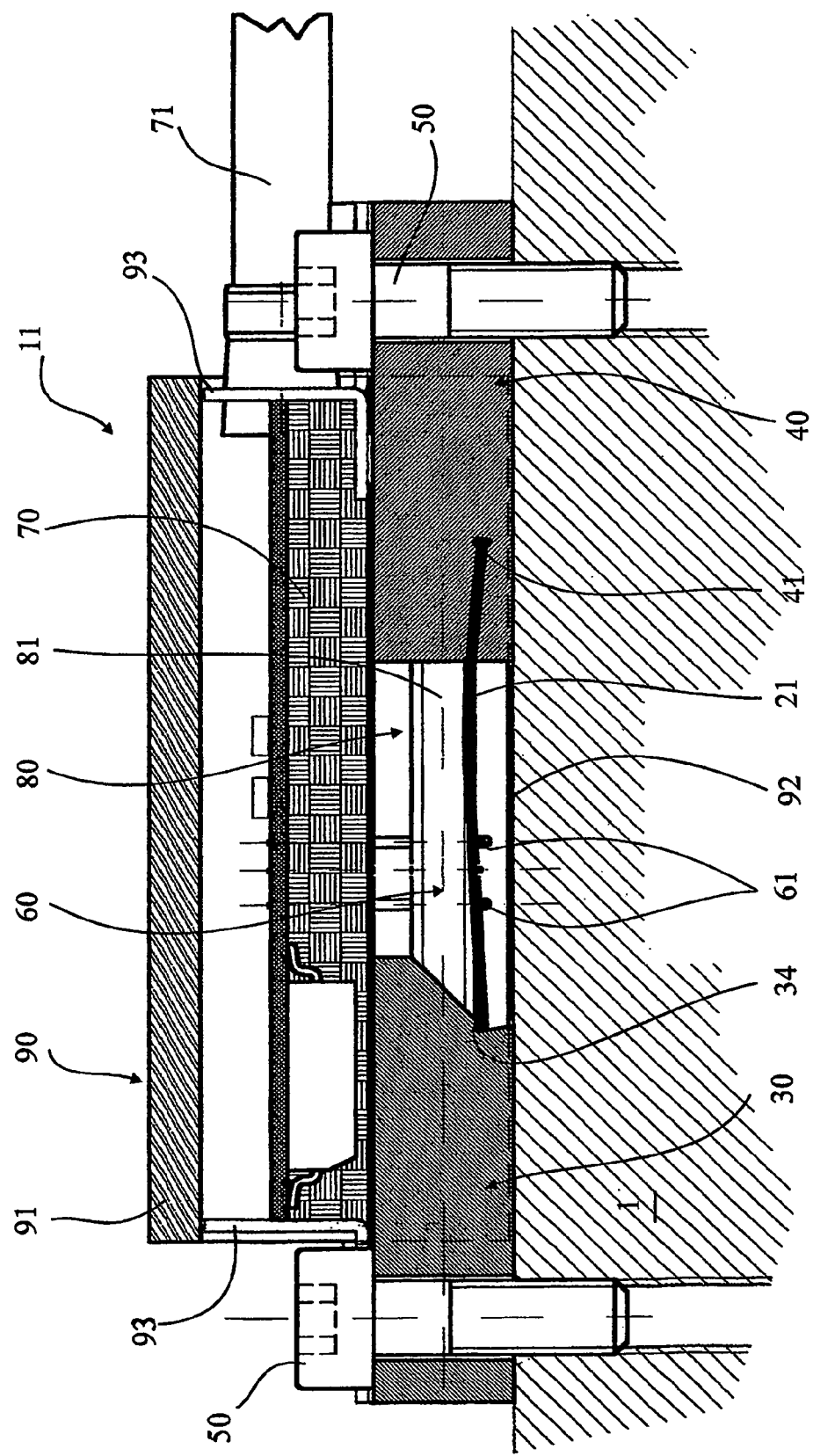
Figure 4:
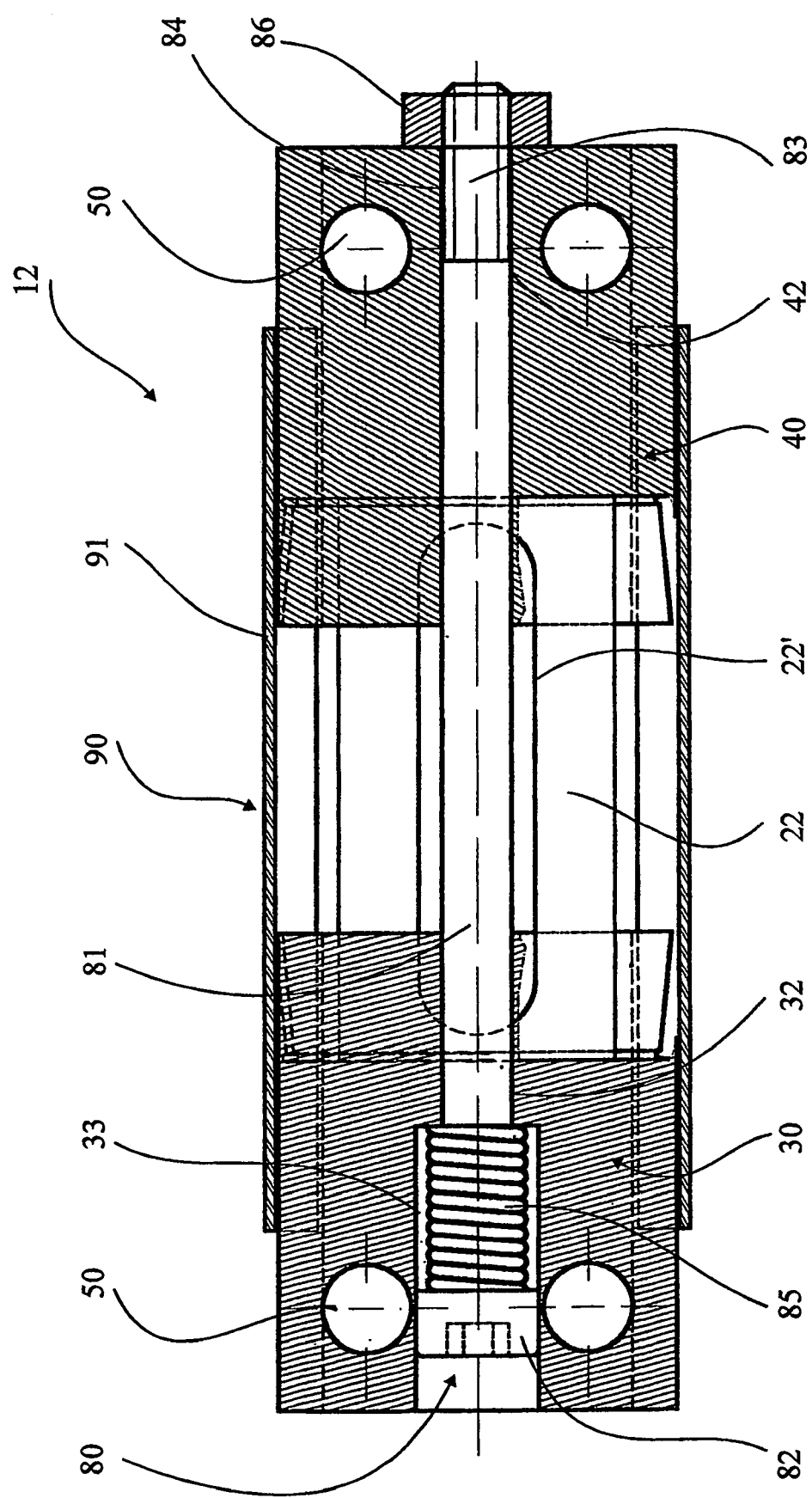
Figure 5:
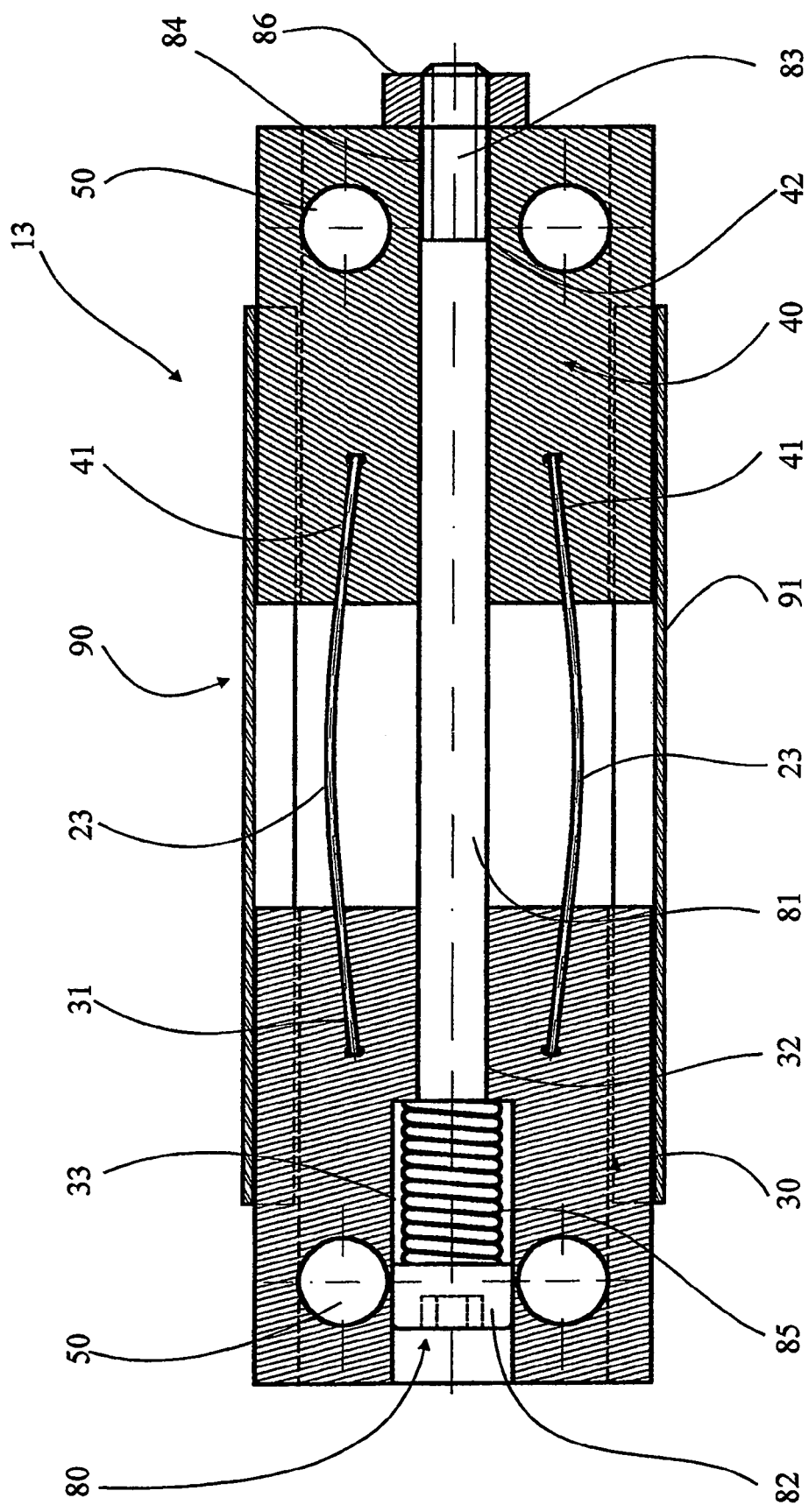
Figure 6:
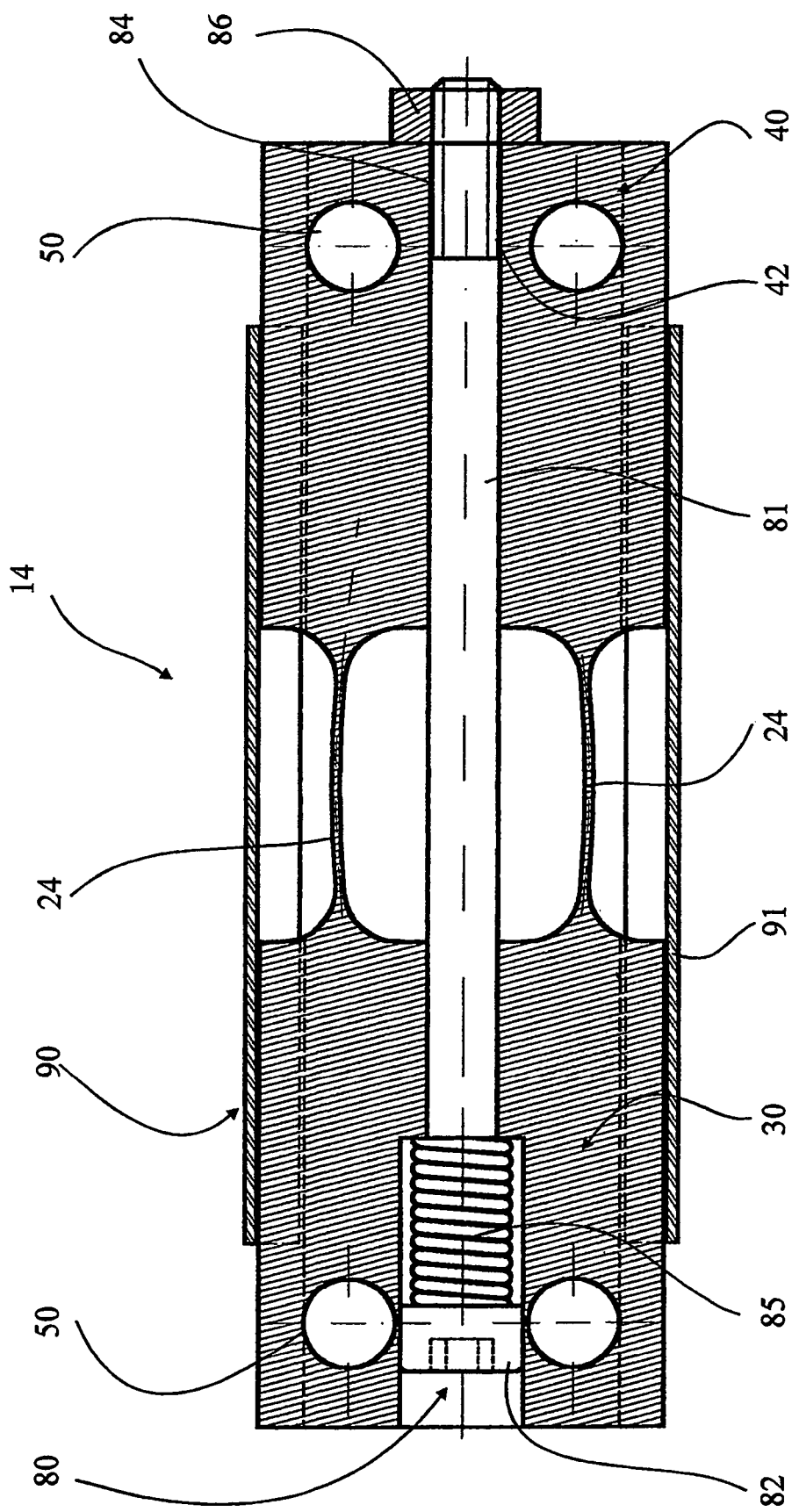
Figure 10:
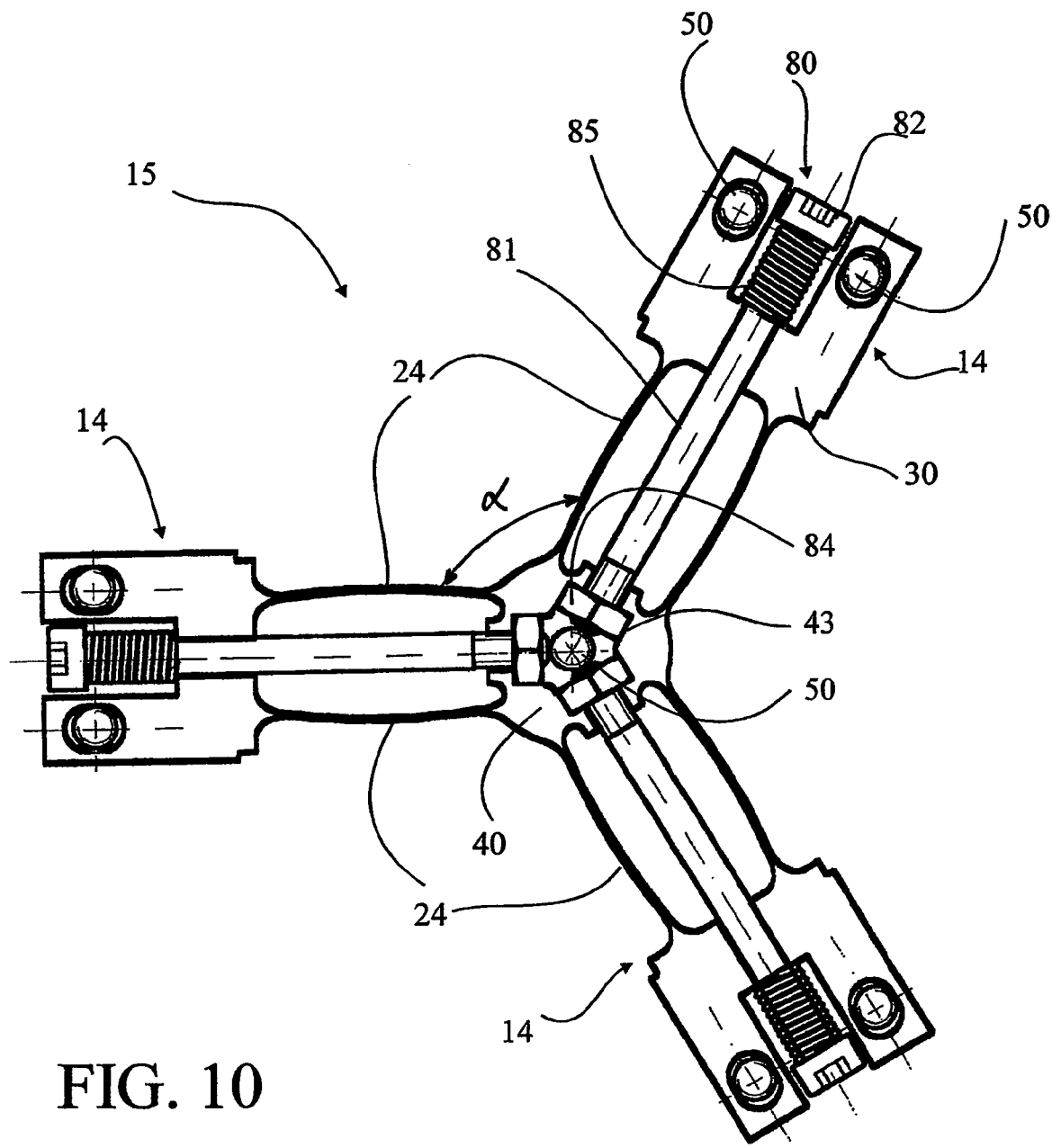
Figure 11:
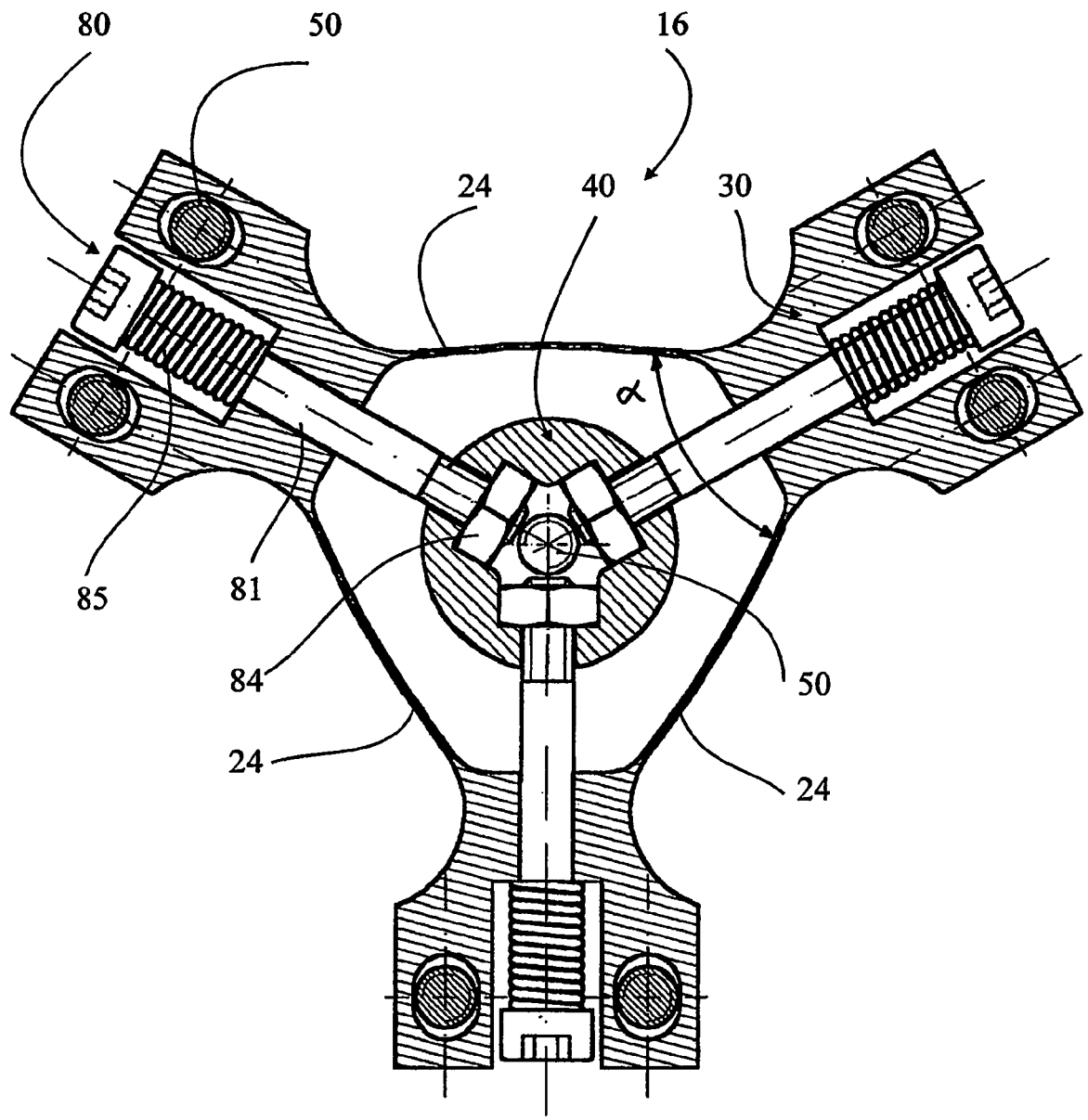

The present invention and its advantages will be more apparent in the following description of, non limiting, implementation examples in reference to the attached drawings, in which:

FIG. 1 is a longitudinally cut view of a first implementation form of the unidirectional strain-measuring device according to the invention, FIGS. 2A, 2B and 2C are traversaly cut views of the device of FIG. 1 according to the cut lines AA, BB and CC, FIG. 3 is a view similar to FIG. 1 of a second implementation form of the device of the invention, FIGS. 4 to 6 are plan cut views of three other implementation forms of the device of the invention, FIG. 7 is a schematic profile view of the device of the invention, FIG. 8 is a schematic view of the electrical wiring of the stress gauges used in the device of the invention, FIGS. 9A, 9B, and 9C represent three implantation examples of the stress gauges of FIG. 8, and FIGS. 10 and 11 represent, in plan view, two examples of a device for measuring bi-directional stress according to the invention.

The mechanical design of the unidirectional strain-measuring device 10–14 can take several implementation forms according to the precision and the extent of the desired measurement. In all the implementation forms, the strain-measuring device 10–14 includes one or two prestressed deformable elements 20–24 extended across at least two mounting contacts 30, 40, which can be integrally joined to the deformable element(s) (not shown) or be formed from interrelated pieces as illustrated. At least one of the ends of each deformable element 20–24 is fixed in one of the mounting contacts 30, 40. These mounting contacts define by their inferior face a fixation surface permitting them to be fixed on the surface of a structure 1 to be measured by fixation screws 50 and/or by gluing. The tensile or compression stresses undergone by the structure 1 to be measured cause differential displacements for the mounting contacts 30, 40. These displacements deform the deformable element(s) 20–24 by augmenting or reducing its or their radius of curvature. One records the deformation of each deformable element 20–24 with the aid of measuring means 60 such as resistive stress gauges glued on one of the faces or on the two faces of each deformable element, a displacement sensor storing its height, a piezo-electric sensor arranged, as stated below, in at least one of the mounting contacts for recording the variation of the reaction force of each deformable element, etc. One can also excite the deformable element(s) into vibration and measure its or their own frequency with the aid of a vibration sensor. The signals furnished by the measuring means 60 are analyzed by the treating means 70, integrated, coupled, or displaced.

The unidirectional strain-measuring device of the invention is distinguished from the prior art by the prestressing means 80, which are extended between the two mounting contacts 30, 40 and which are arranged for drawing together these two mounting contacts and imposing a precise and regulatable curvature of prestress with the deformable element(s) 20–24. These prestressing means 80 are also arranged for permitting a relative displacement between the two mounting contacts when the deformable element(s) 20–24 are prestressed.

More specifically referring to FIGS. 5 and 6, the unidirectional strain-measuring device 13, 14 is also distinguished from the prior art in that it includes two deformable elements 23, 24 symmetric with respect to a median plane and arranged approximately perpendicular to the fixation surface of the contacts and thus to the structure 1 to be measured, so that they are deformed in a plane parallel to this surface. Conversely, in the other implementation forms referring to FIGS. 1 to 4, the strain-measuring device 10–12 includes a central deformable element 20–22, arranged approximately parallel to the fixation surface of the contacts, so that it is deformed in an plane perpendicular to this surface.

Finally and referring to FIGS. 10 and 11, the strain-measuring devices 15 and 16 are more particularly distinguished from the prior art in that they integrate in a single piece several unidirectional measuring device permitting measurement of deformations in at least two directions.

In the illustrated examples, the deformable element(s) 20–24 are constituted by at least an elastic strip made of stainless steel with or without structural hardening, of an alloy of titanium, copper, or beryllium, etc., possibly forming a single piece with the mounting contacts 30, 40. The prestressing means 80 are formed from at least a prestressing rod 81 provided at least with a head 82 at an end and a threaded part 83 at the other end coupled to a nut 84 cooperating with a compensation member 85. This prestressing rod 81 can be a bolt, a screw, a pin, a rod with two inverse threads. The nut 84 can be integrated, coupled to or made of a tapping in the mounting contacts 30, 40, and the compensation member 85 can be a spring of compression or pulling according to its positioning, a stack of elastic washers, a wedge of elastomer, one or several leaf springs and any equivalent elastic means of which the stiffness can be chosen and/or adjusted according to need. The combination formed by the prestressing rod 81 and the nut 84 can also be replaced by an axle coupled to an eccentric, a cam, cogs, or any equivalent means allowing displacement in translation a mounting contact with respect to the other in a precise and reproducible manner. If the measuring means 60 are constituted of piezoelectric sensors, the latter can be positioned under the head 82 of the prestressing rod 81, under the compensation member 85 or under the nut 84.

A first implementation form of the strain-measuring device 10 is illustrated in FIGS. 1 and 2, FIG. 1 being a longitudinally cut view of this device according to a cutting plane passing through a prestressing rod 81 and FIGS. 2A to 2C being traversaly cut views according to cutting planes passing respectively though the fixation screw 50 of the mounting contact 30 on the structure 1 to be measured, through the deformable element 20 and through the fixation screws 51 of the deformable element 20 in the mounting contact 40. In this example, the deformable element 20 has an approximately rectangular form. Each end of this deformable element 20, formed by the short sides of the rectangle, is fitted in a slit 31, 41 provided in the corresponding mounting contacts 30, 40 and fixed by two fixation screws 51. These slits 31, 41 are inclined with respect to the fixation surface of the contacts for imposing on this deformable element 20 an initial curvature in the direction of its prestress curvature. The fixation of the ends of the deformable element 20 can also be obtained by any other means such as laser welding, electron bombardment, direct clamping of the two fixation screws, etc. These other fixation means allow, if necessary, to eliminate the slits 31, 41 costly to manufacture in the mounting contacts 30, 40. In all these cases, the mounting contacts 30, 40 include a mounting zone inclined with respect to their fixation surface for giving to the deformable element 20 an initial curvature in the direction of its prestress curvature.

The prestressing means 80 of the deformable element 20 include two prestressing rods 81 arranged in parallel and symmetrically with respect to the deformable element 20 to uniformly distribute the forces and to impose on the deformable element 20 a deformation by buckling in a single direction, this direction being predefineable by the initial curvature, which is given to it at the time of its assembly in the mounting contacts 30, 40. Each prestressing rod 81 freely traverses the mounting contact 30 arranged near its head 82 through a straight boring 32 and is screwed in a tapping 42 provided in the other mounting contact 40, this tapping 42 constituting the nut 84. A counter-nut 86 is provided at the end of the prestressing rod 81 for avoiding all risk of unscrewing and thus of unsetting of the prestress. For reducing the cost of manufacture, each prestressing rod 81 can freely traverse the mounting contacts 30 and 40 through the straight borings 32 and 42 to be screwed in the nut 86 forming the nut 84 coupled for example in a cavity blocking it from rotating provided in the mounting contact 40.

One of the two prestressing rods 81 can be replaced by a simple smooth guiding rod. The presence of the two prestressing rods 81 simplifies the implementation by allowing utilization of identical pieces. This implementation allows precise regulation of the prestress curvature of the deformable element 20 and makes this regulation reproducible since the distance between the two mounting contacts 30, 40 is measurable and can be reproduced easily. Furthermore, the prestressing rods 81 allow mechanical tying of the two mounting contacts 30, 40 avoiding any risk of unsetting. Furthermore, this implementation allows balancing of forces by functioning on the fixation points of the mounting contacts 30, 40 on the structure 1 to be measured, making the interactions with this structure very weak, and (allowing) conservation of the regulation of the prestress during transportation or in case of dismounting of the strain-measuring device 10. A compensating member 85 is coaxially arranged on each prestressing rod 81 between its head 82 and the mounting contact 30 in a cavity 33 provided for this effect. It allows a relative movement between the two mounting contacts 30, 40 so that they can follow deformations of the structure 1 to be measured.

The treatment means 70 of the signals emitted by measuring means 60 are constituted by an electronic signal conditioning circuit placed directly above the deformable element 20 and mounting contacts 30, 40. It allows integration of the circuits for regulation of voltage, for regulation of gain, for shifting of offset and for thermal compensation without providing resistances for compensation of temperature on the deformable element 20. However, it is possible to add such resistances for temperature, according to arrangements well known to the person skilled in the art, for improving the precision of the thermal compensation.

This strain-measuring device 10 is lodged in a protective housing 90, which can be waterproofed or not according to the environment in which it is placed. In the illustrated example the protective housing 90 is not waterproofed and includes a cover 91 covering the upper and side parts of the strain-measuring device 10 as well as a plaque 92 arranged between the two mounting contacts 30, 40. The protective housing 90 remains open at its ends to allow a lap of conductive wires 71 allowing electrical supply of the stress gauges, connection of the electronic conditioning circuit 70 to a signals reading apparatus and/or to an information management unit for example (not shown). The cover 91 can be joined to the mounting contacts 30, 40 by interlocking, clamping or casting. The plate 92 can serve as a buttress to avoid deterioration of the deformable element 20 by excessive tightening of the prestressing means 80.

Mounting and adjustment of the strain-measuring device 10 is realized in the following manner. The deformable element 20 is mounted in the mounting contacts 30, 40 by fitting its ends in the slits 31, 41 then solidly fixed by the four screws 51. The inclination of the slits 31, 41 elastically deforms the deformable element 20, which takes an initial curvature. The prestressing rods 81 with their compensating member 85 are engaged in the mounting contact 30 then screwed in the mounting contact 40. The rotation of the compensation rods 81, by means of a tool adapted to the impression provided in the head 82, has the effect of compressing the compensation members 85 and pulling mounting contacts 30, 40 toward each other, driving the bending and the augmentation of the radius of curvature of the deformable element 20 thus causing its prestress. The presence of the compensation members 85 makes the adjustment finer. Their reaction allows balance of the horizontal forces exerted by the deformable element 20 on the mounting contacts 30, 40. The guidage of the mounting contacts 30, 40 by the prestressing rods 81 balances the moments imposed on these contacts and caused by the buckling of the deformable element 20. This guidage imposes on the deformable element 20 a deformation in a single direction generating a drawing together of their two points of fixation, thus of the two mounting contacts 30, 40, of a certain value. Knowledge of this value permits the reproducibility of the prestress adjustment of the deformable element 20.

Once the strain-measuring device 10 is preadjusted, one can glue it and/or screw it onto the surface of a structure to be measured for the purpose of measuring the deformations of this structure, or beforehand on a standard piece for the purpose of calibrating and adjusting the electrical characteristics of the measuring means 60. The compensation members 85, opposing the horizontal forces of the deformable element 20, reduce the forces in their fixation points in the mounting contacts 30, 40. Nevertheless, the elasticity of these compensation members 85 allows the functioning of the strain-measuring device 10 without needing to withdraw the prestressing rods 81. The particular disposition of these prestressing rods 81 allows utilization of fixation screws 50 of reduced cross section or simple gluing without risk of creeping of the strain-measuring device 10.

This first implementation form, which uses a hyperstatic assembly of the deformable element 20, allows achievement of a strong sensitivity, a good measurement precision and good reproducibility of the prestress. On the other hand, it limits the extent of measurement, considerably complicates the assembly and can present large thermal drifts. In fact, the hyperstatic assemblies permit no degree of freedom for the dilations and thus lead to elevated thermal stresses.

A second implementation form of a strain-measuring device 11 is represented in FIG. 3, which is a longitudinally cut view according to a cutting plane passing through fixation screws 50 of the device on the structure 1 to be measured. In this variation, the deformable element 21 is fitted to a single side in a slit 41 of the mounting contact 40, forming a "cantilever" beam. The other end is retained in the other mounting contact 30 by a lip 34 of a superior support. As in the preceding example, the slit 41 is inclined with respect to the fixation surface of the contacts to give the deformable element 21 an initial curvature in a direction of its prestress curvature. This assembly is isostatic and allows a larger extent of measurement with equal dimensions and a reduced sensitivity to the thermal variations because it offers a larger degree of freedom. The protective housing 90 includes two end walls 93 that approximately seal openings left between the mounting contacts 30, 40 and the cover 91. One of the end walls 93 allows the passage of a lap of conductive wires 71 from the electronic conditioning circuit 70.

Three other implementation forms are represented respectively in FIGS. 4 to 6, in which the strain-measuring device 12, 13, 14 includes only a single prestressing rod 81, arranged in the median plane of the device. These FIGS. 4 to 6 are plan cut views according to a cutting plane passing through this prestressing rod 81 and showing three implementation examples of the deformable element 22, 23, 24.

In the third implementation form referring to FIG. 4, the strain-measuring device 12 includes a deformable element 22 having an approximately rectangular shape larger than precedents 20, 21. This deformable element 22 includes a central hollow 22' having a width greater than the diameter of the prestressing rod 81 allowing it to pass when the deformable element 22 is prestressed. The ends of this deformable element 22 form a larger seat in the mounting contacts 30, 40 and secure a deformation of the deformable element 22 in a single direction, this direction being predefineable by an initial curvature given to this deformable element 22 at the time of its assembly. This construction being balanced in the horizontal plane, a single prestressing rod 81 is necessary. The central hollow 22' lessens the cross section of the deformable element 22 and avoids exaggerated augmentation of the horizontal forces in its fixation points. The shape of this deformable element 22 can present advantages for implantation of stress gauges 60 (not shown in this Figure). Its fixation in the mounting contacts 30, 40 can be implemented according to the hyperstatic assembly of FIG. 1 or according to the isostatic assembly of FIG. 3.

In the fourth implementation form referring to FIG. 5, the strain-measuring device 13 includes two identical deformable elements 23 mounted symmetrically with respect to the median plane of the strain-measuring device 13, on both sides of the prestressing rod 81. As in the preceding example, the objective of this realization is to balance the reaction forces of the deformable elements in the mounting contacts 30, 40. In this implementation, the deformable elements 23 are mounted on their side and their ends are fitted in slits 31, 41 provided in the mounting contacts 30, 40 and inclined with respect to the median plane to give to the deformable elements 23 an initial curvature in a direction of their prestress curvature. In this assembly, the reaction forces of the two deformable elements 23, from the vertical axis, tend to turn the mounting contacts 30, 40 in the horizontal plane, mutually balancing themselves. The compensating member 85 compensates the horizontal reactions in the same manner and the sum of these reactions exerted on the structure to be measured is null when the strain-measuring device 13 is in initial position. The axial guidage of the prestressing rod 81 in the mounting contacts 30. 40 becomes unnecessary because of the perfect symmetry of assembly permitting balancing of the forces. The only force exerted on the structure to be measured is the difference between the reaction of the deformable elements 23 and of the compensating member 85 for a given functioning position.

In the fifth implementation form referring to FIG. 6, the strain-measuring device 14 differs from the preceding one in that the two mounting contacts 30, 40 and the two deformable elements 24 are formed by a single piece plate of small width. This variation is advantageous from an economic point of view considering the reduction of the number of pieces and the ease of assembly as well as the mechanical point of view considering the suppression of inevitable non-linearities in any assemblage. Furthermore, it can be realized at lower cost, this piece being able to be obtained by cutting from laminated sheets or adjusted by any known means such as wire electroerosion, water jet, tool cutting, etc. To realize this piece, one will preferably choose a material of which the coefficient of dilation is close to that to the structure to be measured 1, such as for example a stainless steel, a steel with a high elastic limit of type Z200 C12, a steel with structural hardening, the titanium alloys, the cooper alloys with beryllium, the aluminum alloys with a high elastic limit, etc. In this form of realization, the deformable elements 24 are manufactured or cut according to a curve to give them an initial curvature in a direction of their prestress curvature.

Whatever the form of realization of the strain-measuring device 10–14 according to the invention, the deformation of the deformable element(s) 20–24 is similar.

Each deformable element 20–24 presents, referring to the schematic of FIG. 7, a convex face A and a concave face B. The convex face A introduces positive tensile stresses in the median zone and negative compression stresses in the fitting zones. On the concave face B, the signs of the stresses are inverted. Several implantations of the measuring means 60 are thus possible. One introduces only the aforementioned complete bridge mountings or Wheatstone bridge using four stress gauges 61, 62 allowing acquisition of the strongest and least perturbable signal. The four stress gauges 61, 62 are connected according to the schematic of FIG. 8. The signals of the two stress gauges 61 or 62 are additionally opposed and the signals of two adjacent gauges 61, 62 are subtracted, which allows by application on the positions of the stress gauges 61, 62 acquisition of interesting combinations of signals. In the implementations of FIGS. 1 to 4, the four gauges 61, 62 are distributed on one or the two faces of the deformable element 20–22 and, in the implementations of FIGS. 5 and 6, the four gauges 61, 62 are distributed two by two on one or the two faces of each of the deformable elements 23, 24.

FIGS. 9A to 9C illustrate three possible arrangements of the stress gauges 61, 62. In FIG. 9A, the four stress gauges 61, 62 are arranged on a single face A or B of the deformable element. They are positioned squarely side by side and are inverted one with respect to one another. It concerns a "traction bridge" arrangement. The two longitudinally oriented stress gauges 61 absorb the principal deformation and two traversely oriented stress gauges 62 record a inverse sign contraction, called the "Poisson effect". The signal with respect to a single stress gauge 61, 62 is multiplied by 2.6. This arrangement requires very small stress gauges 61, 62 and is particularly advantageous in the case of stress gauges arranged in thin layers.

In FIG. 9B, one glues the stress gauges 61, 62 longitudinally aligned two by two in the middle of each face A and B of the deformable element 20–24.

This arrangement has the advantage of providing a stronger signal and allowing utilization of larger stress gauges 61, 62. However their positioning is complex.

In FIG. 9C, one arranges the four stress gauges 61, 62 on a single face A or B of the deformable element 20–24. They are rectangularly positioned and oriented longitudinally. This arrangement proves to be the most interesting because it permits absorption of a signal almost as strong as with the arrangement of FIG. 9B, all in not requiring except a single face of the deformable element 20–24 by taking advantage of the change of sign of the stresses near ends of the deformable element 20–24.

In the strain-measuring devices 10–14 represented in FIGS. 1 to 7, the arrangement of the stress gauges 61, 62 in accordance with FIGS. 8 and 9 is such that the deformable element(s) 20–24 are not sensitive except to the linear deformations of the structure 1 to be measured, that is to say oriented in the longitudinal axis of each deformable element 20–24. This implies knowing in advance the direction of the deformation to be measured.

In the strain measuring devices 13 and 14 of FIGS. 5 and 6, one can easily arrange the stress gauges 61, 62 in such a manner that the deformable elements 23 and 24 are sensitive to distortion (shearing forces). For this effect, one can connect, referring to FIG. 9C, the two stress gauges 61 of the middle in two adjacent branches of the Wheatston bridge and the stress gauges 62 of the end in the two remaining branches of the bridge.

In the hypothesis where the direction of the deformations to be measured is unknown, the strain-measuring device must be able to detect bi-directional deformations contained in a plane by means of two or three deformable elements oriented according to different directions. It is necessary in effect to be able to determine three unknowns: the two principal elongations and their angle of orientation in a common plane.

The original design of the strain-measuring device 10–14 according to the invention enables providing a simple and economical solution combining two or three similar devices in one. FIG. 10 illustrates an implementation example of a bi-directional strain-measuring device 15 combining three strain-measuring devices 14 of FIG. 6. The three strain-measuring devices 14 are assembled in one around a common mounting contact 40 and arranged at the center. The three other mounting contacts 30 are arranged at equal distance from the central contact 40 and are angularly shifted from each other at an angle α approximately equal to 120° in a manner to cover 360°. Other configurations are possible. Preferably, one chooses values of the angle convenient for calculations, as for example 45°, in which case the device covers 90°, or 60° in which case the device covers 120°.

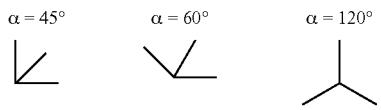

FIG. 11 illustrates another implementation example of a bi-directional strain-measuring device 16 also including three mounting contacts 30 arranges at equal distance from a central contact 40 and angularly shifted from each other at an angle α approximately equal to 120° in a manner to cover 360°. The difference resides in the deformable elements 24, which are three in number and are each extended between two mounting contacts 30 for approximately forming a triangle or a delta.

Implementing the bi-directional strain-measuring device 15–16 using the technology used in the device 14 enables manufacturing simply and at lower cost the combination formed by the mounting contacts 30, 40 and the deformable elements 24 in a common cut piece. The deformable elements 24 are, preferably, manufactured or cut according to a slight curve to give them an initial curvature in a direction of their prestress curvature. They are prestressed independently or by pair by means of one or two prestressing rods 81, each screwed in a connected nut 84 and lodged in a hollow 43 provided in the central assembly contact 40. This prestress is of course reproducible and reliable as in all the variants of realization described above. In the strain-measuring device 16, the common, central mounting contact 40 can be not glued or fixed on the structure 1 to be measured.

Each deformable element 24 is equipped with stress gauges 61, 62 and function as a unidirectional sensor. One then utilizes the properties know by the person skilled in the art of Mohn's circle to determine the modules and the directions of the deformations of the structure 1 to be measured. One can reconstruct the matrix of the deformation in a point in the direction of the deformable elements 24. In this particular implementation, one generates three different signals that one can treat subsequently or directly by the electronic conditioning circuit that then integrates the calculations necessary to the treatment of the signals.

Each deformable element 24 can receive four stress gauges 61, 62 positioned and cabled to be sensitive to the longitudinal deformations and at least one of the deformable elements 24 can receive four stress gauges 61, 62 positioned and cabled to be sensitive to the shear. In this case and only for the strain-measuring device 15, it is possible to utilize only two strain measuring devices 14 arranged at a right angle.

It follows clearly from the present description that the invention enables achievement of the fixed goals. The particular design of the strain-measuring device 10–16 enables very simple implementations and utilizations thanks to optimization of certain characteristics:

Setting of the strain-measuring device 10–16 on the structure 1 to be measured is very rapid, economical, and does not require intervention of a specialized technician.

The setting does not require any modification of the structure 1 to be measured.

The stiffness of the measuring device 10–16 is very low in the face of the structure 1 to be measured thus has no influence on it.

The balancing of the forces of the fixation points enables setting of the measuring device 10–16 on the structure 1 to be measured solely with the aid of small fixation screws 50 or simple gluing.

The strain-measuring device 10–16 can be made entirely waterproof in case of severe environmental conditions.

The electronic conditioning circuit 70 can be integrated.

Numerous characteristics can be programmed before the use of the measuring device 10–16, such as the relation between the measured deformation and the output electric signal, and the compensation of the dilation of the deformable element 20–24.

Certain characteristics can be remotely reprogrammed without mechanical intervention on the measuring device 10–16, such as the value of the shift, a precise recalibration in situ, etc.

Of course, the present invention is not limited to the described implementation examples but extends to all modification and variation apparent to a person of skill in the art all remaining within the scope of the protection defined in the annexed claims.

The invention claimed is:

1. A strain-measuring device including
   a deformable element placed between two mounting contacts defining a fixation surface for being fixed on a structure to be measured,
   prestressing means of the aforementioned deformable element,
   measuring means of the stress undergone by the aforementioned deformable element, and
   treatment means of measurement signals,
   characterized in that the prestressing means is extended between the two mounting contacts and is arranged for drawing together these two mounting contacts in translation and imposing a curvature of prestress to the deformable element, the prestressing means being also arranged for allowing a relative displacement in translation of these two mounting contacts when the deformable element is prestressed.

2. The device according to claim 1, characterized in that the prestressing means is freely mounted in translation in one of the mounting contacts and are tied in translation to the other mounting contact.

3. The device according to claim 2, characterized in that the prestressing means includes a prestressing rod, of which the part tied in translation to the mounting contact is threaded and cooperates with a nut for displacing the mounting contact and a compensation member arranged for exerting a return force between the prestressing rod and one of the mounting contacts.

4. The device according to claim 1, characterized in that the prestressing means is tied in translation to the two mounting contacts.

5. The device according to claim 4, characterized in that the prestressing means includes a prestressing rod, of which the parts tied in translation to the mounting contacts are threaded in an opposite direction, two nuts arranged for receiving the threaded parts from the prestressing rod and a compensation member arranged for exerting a return force between the mounting contacts.

6. The device according to claim 1, characterized in that the deformable element is mounted by one of its ends in one of the mounting contacts by a technique chosen from the group comprising fitting, interlocking, screwing, riveting, gluing, and welding.

7. The device according to claim 6, characterized in that the mounting contact comprises a mounting zone for receiving an end of the deformable element, this mounting zone being inclined with respect to the fixation surface of the mounting contact in a manner to give to the deformable element an initial curvature in a direction of its prestress curvature.

8. The device according to claim 1, characterized in that the mounting contacts are for fixing on the structure to be measured by a technique chosen from the group comprising screwing, riveting, gluing, and welding.

9. The device according to claim 1, characterized in that the measuring means of the stress undergone by the deformable element is chosen from the group comprising resistive stress gauges, piezo-electric sensors, contactless proximity sensors, and vibration sensors.

10. The device according to claim 9, characterized in that the stress gauges are four in number and mounted as a Wheatstone bridge.

11. The device according to claim 1, characterized in that it comprises a protective housing partially covering the mounting contacts and the deformable element(s).

12. The device according to claim 11, characterized in that the protective housing is waterproofed.

13. The device according to claim 11, characterized in that the treatment means of the comprises at an electronic conditioning circuit, this circuit being integrated with or coupled to the housing, or displaced and linked to the housing by means of communication.

14. The device according to claim 1, characterized in that the treatment means is arranged for measuring the internal temperature of the device and correcting the values of the signals as a function of this temperature.

15. The device according to claim 3 wherein the nut is integrated with the corresponding mounting contact.

16. The device according to claim 3 wherein the nut is defined by a tapped boring in the mounting contact.

17. The device according to claim 3 wherein the prestressing means comprises a supplemental nut coupled to the end of the threaded part of the prestressing rod and forming a locking counter nut.

18. The device according to claim 3 wherein the prestressing rod is chosen from the group comprising screws, bolts, and pins.

19. The device according to claim 3 wherein the compensation member is chosen from the group comprising springs, elastic washers, wedges of elastomer, and leaf springs.

20. The device according to claim 3 wherein there is no more than one deformable element, arranged between two identical mounting contacts approximately parallel to the fixation surface of these contacts and arranged for deforming itself in a plane approximately perpendicular to this surface.

21. The device according to claim 20 wherein the prestressing means comprises two prestressing rods arranged parallely and symmetrically with respect to the median plane passing through the deformable element.

22. The device according to claim 20 wherein the prestressing means comprises a prestressing rod and a guiding rod arranged parallely and symmetrically with respect to the median plane passing through the deformable element.

23. The device according to claim 20 wherein the prestressing means comprises a prestressing rod arranged in the median plane passing through the deformable element.

24. The device according to claim 23 wherein the deformable element comprises a central hollow of traverse dimensions superior to those of the prestressing rod.

25. The device according to claim 3 wherein it comprises two deformable elements arranged between two identical mounting contacts symmetrically with respect to a median plane of the device, approximately perpendicular to the fixation surface of these contacts and arranged for deforming themselves in a plane approximately parallel to this surface.

26. The device according to claim 25 wherein the prestressing means comprises a prestressing rod arranged in the median plane.

27. The device according to claim 1 wherein it comprises two distinct mounting contacts and a common mounting contact.

28. The device according to claim 27 wherein it comprises a deformable element extending between the common mounting contact and each distinct mounting contact, the deformable elements being angularly shifted from an angle $\alpha$.

29. The device according to claim 28 wherein the angle a is equal to a value chosen from the group comprising 30°, 45°, 60°, 90°, and 120°.

30. The device according to claim 27, in that it includes three distinct mounting contacts and a common mounting contact, a deformable element extending between each pair of distinct mounting contacts, the deformable elements being arranged approximately in a triangle.

31. The device according to claim 1 wherein the deformable element includes an elastic strip of a material chosen from the group comprising stainless steel with or without structural hardening, titanium alloys, and copper alloys with beryllium.

32. The device according to claim 1 wherein the deformable element and the mounting contacts are formed from a single piece in a material of which the coefficient of dilatation is close to that of the structure to be measured, this material being chosen from the group comprising stainless steel with or without structural hardening, titanium alloys, copper alloys with beryllium, and aluminum alloys having a high elastic limit.

33. The device according to claim 32 wherein the deformable element is manufactured or cut in a manner to give it an initial curvature in a direction of its prestress curvature.

34. A method of measuring strain, the method comprising:
placing a deformable element between two mounting contacts on a structure;
prestressing the deformable element;
measuring the stress undergone by the deformable element, to produce a measurement signal; and
wherein prestressing includes drawing together the mounting contacts and imposing a curvature of prestress to the deformable element, to allow a relative displacement in translation of the mounting contacts when the deformable element is prestressed.

* * * * *